United States Patent [19]
Chabala

[11] 3,915,512
[45] Oct. 28, 1975

[54] ANTI-SKID BRAKE CONTROL SYSTEM AND FAILSAFE CIRCUIT THEREFOR

[75] Inventor: Dennis Bernard Chabala, West Los Angeles, Calif.

[73] Assignee: International Telephone & Telegraph Corporation, New York, N.Y.

[22] Filed: July 18, 1974

[21] Appl. No.: 489,591

[52] U.S. Cl. ............................ 303/21 AF; 340/52 B
[51] Int. Cl.² ............................................ B60T 8/00
[58] Field of Search .......... 303/21 AF, 7; 317/9 AC, 317/9 D, 60 A, 148.5 R; 318/563, 565; 324/51; 328/146; 340/52 B, 253 B

[56] References Cited
UNITED STATES PATENTS

| | | |
|---|---|---|
| 3,620,577 | 11/1971 | Neisch et al. ......................... 303/7 X |
| 3,680,923 | 8/1972 | Peterson et al. .................. 303/21 AF |
| 3,759,582 | 9/1973 | Ohta et al. ....................... 303/21 AF |
| 3,825,307 | 7/1974 | Carr et al. ........................ 303/21 AF |
| 3,841,712 | 10/1974 | Syria ............................... 303/21 AF |

*Primary Examiner*—Trygve M. Blix
*Assistant Examiner*—Stephen G. Kunin
*Attorney, Agent, or Firm*—A. Donald Stolzy

[57] ABSTRACT

An anti-skid system for use in connection with air brakes wherein a failsafe circuit is provided to disable the system controller and return operation to manual if an open happens to develop in the brake valve solenoid.

6 Claims, 2 Drawing Figures

ANTI-SKID BRAKE CONTROL SYSTEM AND FAILSAFE CIRCUIT THEREFOR

BACKGROUND OF THE INVENTION

This invention relates to a type of system having a controller for automatically releasing and/or reapplying air brakes to prevent a skid and yet to slow a vehicle eventually when the brakes are applied by the vehicle operator, and more particularly, to a failsafe circuit for use in such a system to disable the controller in the event an open happens to develop in the air valve solenoid winding.

This invention will have other applications, but will be found to be especially useful in an anti-skid brake control system.

In the past, failure of a brake valve solenoid has been troublesome and hazardous.

SUMMARY OF THE INVENTION

In accordance with the present invention, the above-described and other disadvantages of the prior art are overcome by providing a failsafe circuit to disable a brake system controller and to return the system to manual from automatic operation should an open develop in the brake valve solenoid winding.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
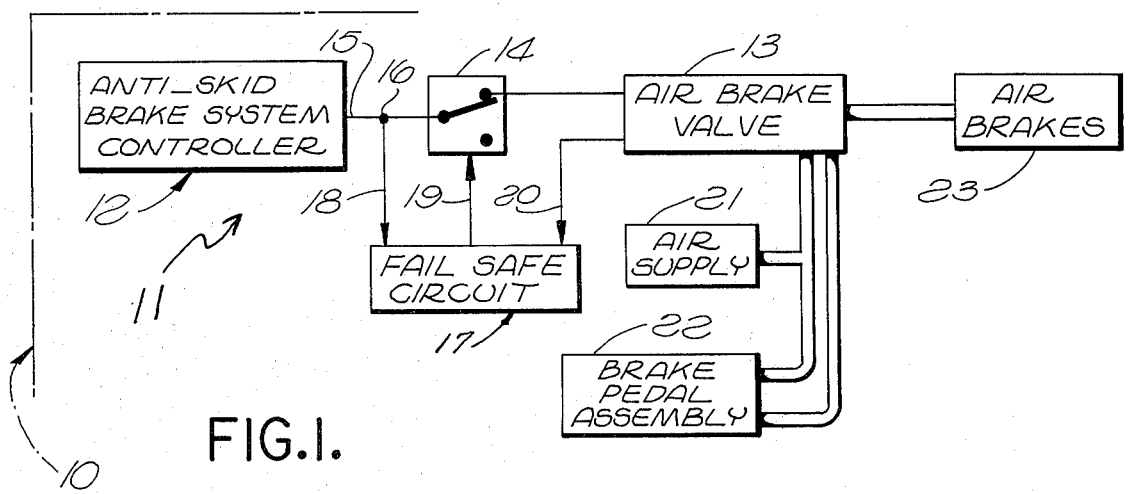
FIG. 1 is a block diagram of a motor vehicle and an anti-skid brake control system therefor.

In FIG. 1, a motor vehicle is indicated at 10 including an anti-skid brake control system 11 having an anti-skid brake system controller 12 connected to the winding of an air brake solenoid valve 13 through a switch 14.

Controller 12 has an output lead 15 connected to a junction 16. Junction 16 is connected to switch 14 and to a failsafe circuit 17. Circuit 17, thus, has an input lead 18 connected from junction 16, an output lead 19 which also forms an input lead to control the position of switch 14, and an input lead 20 connected to the winding of air brake solenoid valve 13.

An air supply 21 is connected to valve 13 and also to a brake pedal assembly 22. Brake pedal assembly 22 is connected to valve 13.

The air brakes are illustrated at 23 and are connected from valve 13.

The entire system 11 may be conventional except for circuit 17. Valve 13 may, if desired, be identical to one of the valves disclosed in copending application Serial No. 359,653 filed May 14, 1973, by Roger Greenwood for COMBINATION VALVE, assigned to the assignee of the instant application.

OPERATION

In the operation of the system 11 shown in FIG. 1, when the brake pedal is depressed, the brakes are applied. However, based on certain conditions, the controller 12 overrides the control of the brakes by the pedal. This is done by the connection of controller 12 to valve 13 via switch 14. While the brake pedal is being depressed, the brakes may be applied, released, reapplied, released again and so forth a small number of times or a great number of times to prevent a skid.

Should the valve winding develop an open, circuit 17 detects this open and changes the position of switch 14 so that controller 12 can no longer override the manual control of the brakes which the operator has by depressing the brake pedal.

Figure 2:
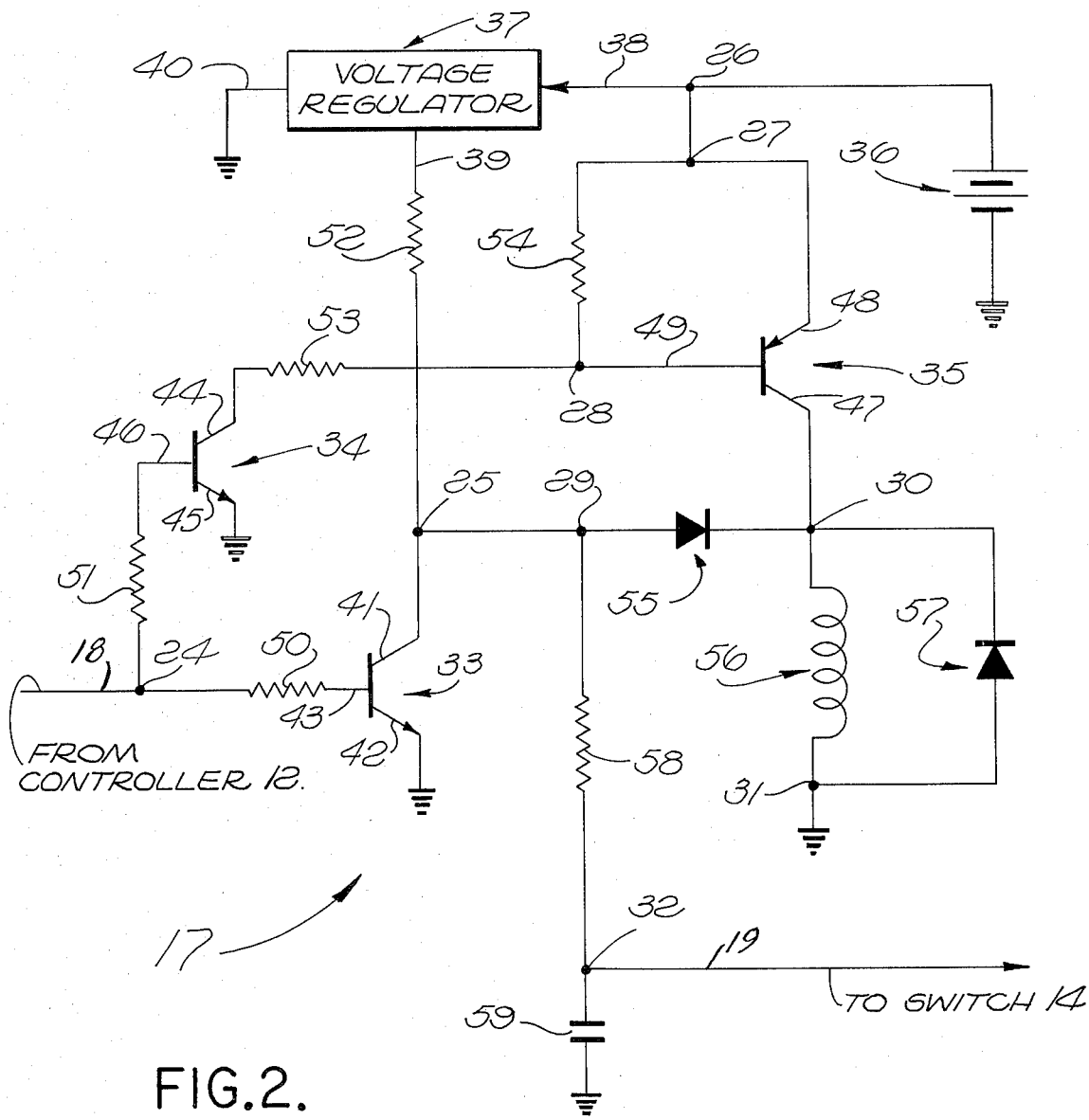
FIG. 2 is a schematic diagram of a failsafe circuit shown in FIG. 1.

Circuit 17 is shown in greater detail in FIG. 2. This circuit has various junctions 24, 25, 26, 27, 28, 29, 30, 31 and 32.

Transisters are provided at 33, 34 and 35. A D.C. source of potential 36 is connected from junction 26 to ground, junction 26 being connected to the positive pole of source 36. Junctions 26 and 27 are connected together. A voltage regulator 37 is provided having an input lead 38 connected from junction 26, an output lead 39 on which a regulated voltage appears, and a lead 40 which is grounded.

Transistor 33 has a collector 41, an emitter 42 and a base 43.

Transistor 34 has a collector 44, an emitter 45 and a base 46.

Transistor 35 has a collector 47, an emitter 48 and a base 49.

Transistors 33 and 34 are NPN transistors. Transistor 35 is a PNP transistor.

A resister 50 is connected between junction 24 and transistor base 43. Junction 24 is connected from controller 12. Both of the transistor emitters 42 and 45 are grounded. A resister 51 is connected from junction 24 to transistor base 46. Collector 41 is connected to junction 25. Junctions 25 and 29 are connected together. A resistor 52 is connected from lead 39 to junction 25. A resistor 53 is connected from collector 44 to junction 28. A resistor 54 is connected from junction 28 to junction 27.

Transistor base 49 is connected from junction 28. Emitter 48 is connected from junction 27. Collector 47 is connected to junction 30. Junction 31 is grounded. A diode 55 is connected between junctions 29 and 30 and poled to be conductive toward juntion 30. The winding of valve 13 is illustrated at 56 in FIG. 2, and is connected between junctions 30 and 31. A diode 57 is also connected between junctions 30 and 31. Diode 57 is employed to reduce the inductive kick of winding 56, but may be omitted in some cases.

A resistor 58 is connected between junctions 29 and 32. A capacitor 59 is connected from junction 32 to ground. Junction 32 is connected over lead 19 in FIG. 1 to switch 14. Switch 14 may be a relay or an electronic switch. Switch 14 may be a transistor switch, if desired.

In FIG. 2, if controller 12 places a low voltage on junction 24 so that winding 56 is deenergized, transistors 33, 34 and 35 will be driven to cut-off. The resistance of winding 56 may be as little as 6 ohms. The potential of junction 29, which would otherwise be raised because of the regulated voltage appearing on lead 39 is, thus, held down because the low resistance of winding 56 shunts the output at junction 29 by shunting resistor 58 and capacitor 59 to ground, winding 56 being connected from junction 29 via diode 55 to junction 31 which is grounded. In this case, diode 55 is forward biased. Junction 30 is at a potential lower than that of junction 29 and junction 29 is thereby clamped to junction 30 by diode 55.

On the other hand, should winding 56 develop an open, even though all of the transistors 33–35 are cut off, diode 57 is back biased, and with the open in winding 56, the potential of junction 30 rises. This back biases diode 55 and allows the potential of junction 29 to rise to a rather high value, which value causes switch 14 to change from the position shown in FIG. 1 to a position in which controller 12 is disconnected from valve 13.

Switch 14 is an entirely conventional self-locking relay or latching electronic or transistor switch which latches in the open position when actuated to that position by circuit 17 and, upon removal of power and the subsequent reapplication thereof, moves the switch back to its unlatched position. For example, switch 14 is shown in its unlatched position in FIG. 1.

The phrase "latching switch" is hereby defined for use in the claims to include either a self-locking relay or a latching electronic or transistor switch or other latching switch.

The entire contents of said copending application Ser. No. 359,653 is, by this reference hereto, incorporated herein as though fully set forth herein hereat.

When the ouput of controller is high, winding 56 is energized because all three transisters 33, 34 and 35 are driven to saturation. Transistor 33 effectively grounds junction 29 in this case and prevents any output to switch 14 from junction 32. Thus, winding 56 in this case is energized if no open exists. On the other hand, no output to switch 14 from junction 32 exists even if there is an open in winding 56. This limiting factor nevertheless has an advantage because a faster disconnection of controller 12 from valve 13 by switch 14 requires a more sophisticated and expensive circuit.

What is claimed is:

1. An anti-skid brake control system comprising: a set of air brakes; a brake pedal assembly; an air brake valve having a winding which, when energized, changes the flow of air into or out of said brakes; an air supply connected to said brake pedal assembly and to said valve, said brake pedal assembly being connected to said valve for manual operation thereof, said valve being connected to said brakes, said valve having an input lead to said winding; a controller to interrupt manual control to aid in preventing a skid, said controller having an output lead; a switch connected between said controller output lead and said valve input lead; and a failsafe circuit having a first input lead connected from said winding, a second input lead connected from said controller output lead, and an output lead connected to said switch for operation of the same to disable the input of said controller to said valve if an open circuit should happen to develop in said winding, said failsafe circuit including first, second, third, fourth, fifth, sixth, seventh, eighth and ninth junctions, said first junction being connected from said controller output lead, said switch being connected from said ninth junction, said winding being connected between said seventh and eight junctions, a first diode connected in parallel with said winding, first, second and third transistors each having a collector, an emitter and a base, first and second resistors connected from said first junction to the bases of said first and second transistors, respectively, the emitters of both of said first and second transistors being connected to ground, a source of potential connected between said third junction and ground, a voltage regulator having a first lead connected from said third junction, a second lead connected to ground and a third lead, said first transistor collector being connected to said second junction, a third resistor connected from said second junction to said regulator third lead, a fourth resistor connected from said second transistor collector to said fifth junction, said third transistor base being connected from said fifth junction, a fifth resistor connected between said fourth and fifth junctions, said third and fourth junctions being connected together, said third transistor emitter being connected from said fourth junction, said third transistor collector being connected to said seventh junction, said eighth junction being connected to ground, said second and sixth junctions being connected together, a second diode connected between said sixth and seventh junctions, a sixth resistor connected between said sixth and ninth junctions, a capacitor connected from said ninth junction to ground, said first and second transistors being of one and the same conductivity type, said third transistor being of a conductivity type opposite that of said first and second transistors.

2. The invention as defined in claim 1, wherein said switch latches open when actuated by said controller to disable the output of said controller.

3. The invention as defined in claim 2, wherein said switch unlatches closed when power is removed therefrom and reapplied thereto and removed from and reapplied to and said controller.

4. The invention as defined in claim 1, wherein said first and second transistors are NPN transistors, said third transistor being a PNP transistor, said first diode being poled to be conductive in a direction toward said third transistor collector, said second diode being poled to be conductive in a direction toward said winding, said regulator first and third leads having potentials positive with respect to ground.

5. The invention as defined in claim 4, wherein said switch latches open when actuated by said controller to disable the output of said controller.

6. The invention as defined in claim 5, wherein said switch unlatches closed when power is removed therefrom and reapplied thereto and removed from and reapplied to and said controller.

* * * * *